Patented Feb. 17, 1931

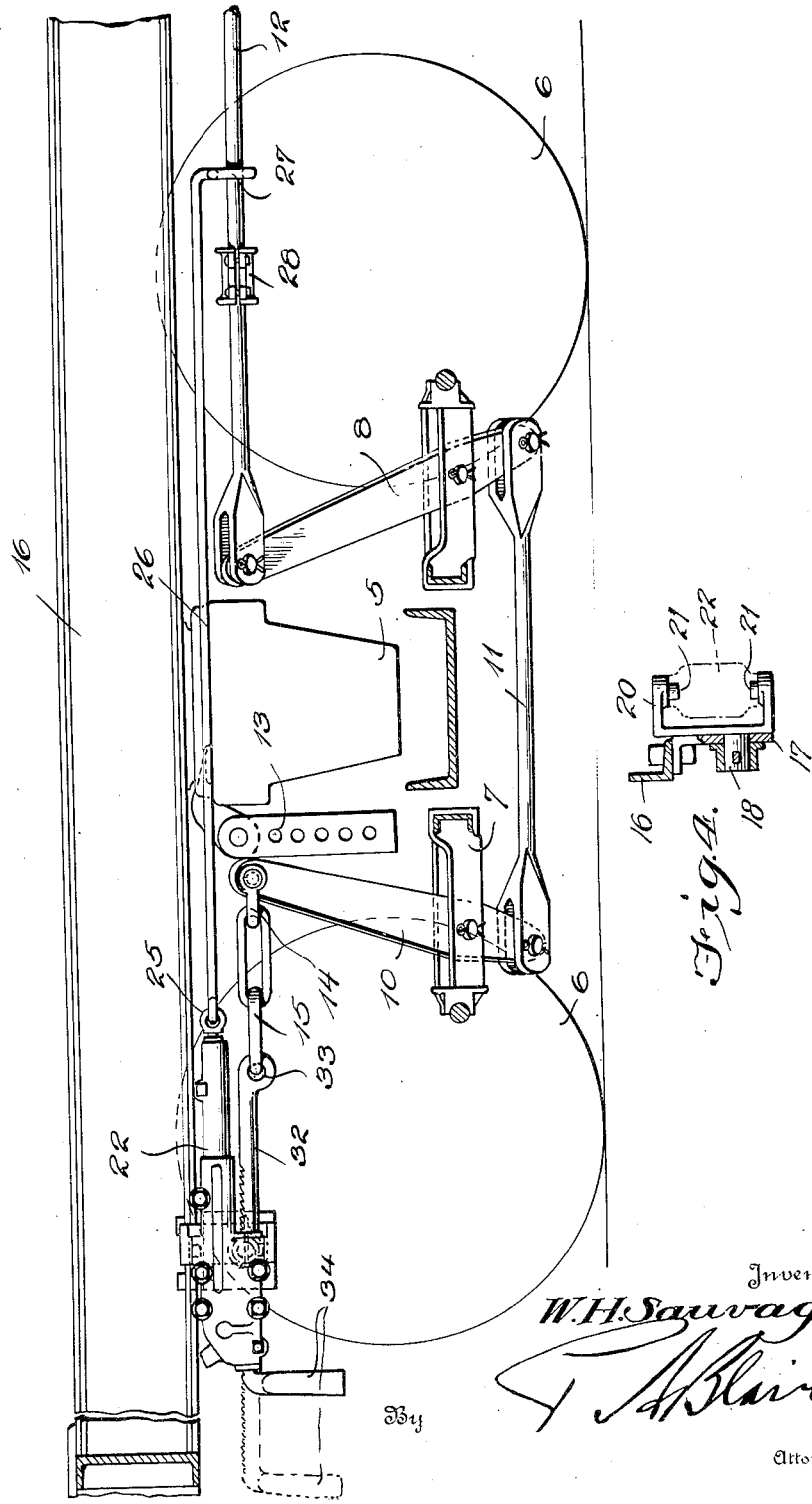

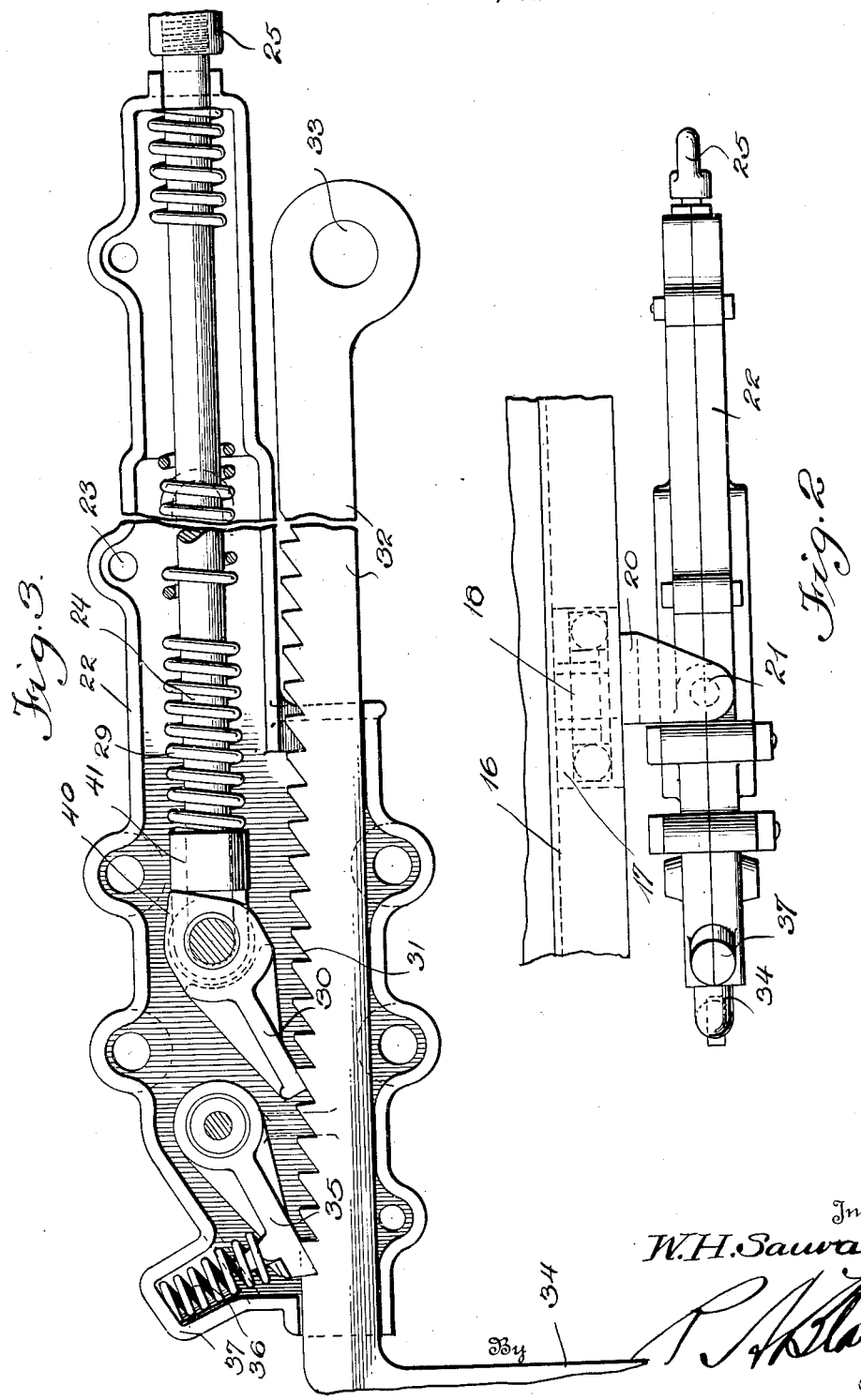

1,792,873

UNITED STATES PATENT OFFICE

WILLIAM H. SAUVAGE, OF NEW YORK, N. Y., ASSIGNOR, BY MESNE ASSIGNMENTS, TO SAUVAGE APPLIANCE CO., INC., OF NEW YORK, N. Y., A CORPORATION OF NEW YORK

SLACK ADJUSTER

Application filed February 9, 1925. Serial No. 7,953.

This invention relates to slack adjusters and more particularly to automatic slack adjusters particularly applicable to the truck brake rigging of railway cars, although without material modification it will be seen that various features are applicable to other parts of the brake rigging as well.

One of the objects of the present invention is to provide a simple and practical automatic slack adjuster which may be inexpensively manufactured, assembled and installed, in connection with the brake rigging now in general use.

A further object is to provide an automatic slack adjuster which will be reliable and efficient in use and operation and which will be substantially fool-proof in action.

A further object is to provide a slack adjuster of the above mentioned character adapted to be associated with the truck brake rigging, yet mounted on the underside of the car body in such manner as to permit relative movement of the brake with respect to the car body without disarrangement of parts.

A further object is to provide an automatic slack adjuster of the last above mentioned character adapted to automatically take up the slack in a truck brake rigging as it occurs and to at all times insure uniform travel of the brake actuating mechanism.

Other objects will be in part obvious from the annexed drawings and in part indicated in connection therewith by the following analysis of this invention.

This invention accordingly consists in the features of construction, combination of parts, and in the unique relations of the various members and in the relative proportioning and disposition thereof, all as more completely outlined herein.

To enable others skilled in the art so fully to comprehend the underlying features thereof that they may embody the same by numerous modifications in structure and relation contemplated in this invention, drawings depicting a preferred form of the invention have been annexed as a part of this disclosure, and in such drawings like characters of reference denote corresponding parts throughout all the views, in which—

Figure 1 is a side elevational view showing such parts of a car, truck and brake rigging with the slack adjuster applied thereto, as is necessary to understand the invention.

Figure 2 is a detail plan view of the slack adjuster; and

Figure 3 is an enlarged sectional view of the slack adjuster.

Figure 4 is a transverse sectional view illustrating the universal support for the adjuster.

Referring now to the drawings in detail and more particularly to Figure 1, 5 indicates the truck bolster at each side of which are positioned wheels 6, brake beams 7, a live lever 8 and a dead lever 10 connected by means of a push rod 11 at their lower ends. The live lever is provided with a pull rod 12 at its upper end connected with any suitable source of power on either the hand brake mechanism or air brake mechanism for applying the brakes. In the present case, the upper part of the dead lever, instead of being connected to the usual bracket 13 now in general use, is disconnected therefrom, and provided with a clevis 14 flexibly connected by links 15 to the slack adjuster mechanism hereinafter described in detail. The parts so far described being of well known construction and operation, further description thereof is believed to be unnecessary.

Positioned above the truck, is a main draft sill 16 extending the entire length of the car and supported on the underside of the sill is bracket member 17 carrying a horizontally disposed pivotally mounted stud 18, as shown more clearly in Figure 2. This stud carries a bifurcated arm 20 provided with vertically disposed trunnion bearings 21 engaging the upper and lower part of the slack adjuster casing 22, as shown clearly in Figure 2. It will thus be seen that the slack adjuster as a whole is permitted a universal joint movement with respect to its support; that is, it may turn in a vertical plane about the stud 18 and in a horizontal plane with respect to the trunnions 21. In this manner, the slack adjuster is maintained in proper operative relation with respect to the truck at all times, regardless of the turning movement of the truck, as when going around curves, or of the load to which the car is subjected.

Referring now to Figure 3, the slack adjuster casing 22 is preferably formed of two cooperating castings bolted or otherwise rigidly secured together by means of fastening devices passing through holes 23, for example. The upper part of the casing 22 provides a barrel in which is mounted an adjusting rod 24 which is surrounded by a spring 29 urging the rod to the left, the rod being provided at one end with an eye 25 connected by means of an actuating rod 26 to the pull rod 12. The end of this rod 26 is bent over and back upon itself to form an eye 27 embracing the rod 12 and upon the latter is the friction clamp or actuating collar 28, as shown in Figure 1, which is normally spaced from the eye 27 when the brakes are in normal or released position. The distance between these parts 27 and 28 is preferably six or seven inches, which constitutes the usual travel of the actuating member when the brakes are applied, and, as it will be hereinafter apparent, further movement of the rod 12 actuates the slack adjuster mechanism to absorb the excess travel. In this manner, the brake actuating mechanism is given a uniform movement at all times.

Referring again to Figure 3, it will be noted that the opposite end of the adjusting rod 24 is provided with a pawl 30 adapted to co-act with a rack 31 upon the upper surface of a take-up rod 32 which is free to move in a direction towards the left, this rod 32 being provided with an eye 33, connected to the links 15. The opposite end of the take up rod 32 is provided with a downwardly extending weighted handle 34 which normally maintains the rack in an upward position, yet provides ready means whereby the rod may be given a quarter turn to throw the pawl 30 out of engagement therewith prior to its being pushed in or towards the right, as shown in full lines in Figure 1, when restoring the parts to normal position, as, of course, is necessary when new brake shoes are applied. A housing 37 on the casing 22 is provided, and has mounted adjacent thereto, a second pawl 35 provided with a holding spring 36 in the housing 37 which normally urges the pawl 35 downwardly into engagement with the rack 31.

The operation of this device is substantially as follows: On application of the brakes, the pull rod 12 moves relatively towards the right, thereby to actuate the live and dead levers and carry the brake shoes supported upon the brake beams into engagement with the peripheries of the wheels 6. If any excess travel occurs exceeding that of a predetermined amount normally permitted between the eye 27 and friction clamp 28, the rod 26 will be moved relatively towards the right and in turn will actuate the adjusting rod 24 within the slack adjuster housing 22 and further compress the spring 29 coiled thereabout. The pawl 30 carried at the end of the rod 24 will ride over one or more teeth of the rack 31 depending upon the amount of excess travel. On release of the brakes, the parts return to normal position under the action of the usual return springs or gravity actuation common in truck brake rigging of this general character, and the spring 29 also expands to force the rod 24 and the pawl 30 towards the left, and with it the take up rod 32. The peculiar construction of the rear or opposite end of the pawl 30, indicated by a heel or extension 40 engaging a collar 41 on the end of the adjusting rod, maintains this pawl in engagement with the rack and carries the rack towards the left on expansion of the spring 29. The pawl 35 is free to ride over the teeth of the rack during this movement and then holds the take up rod 32 in its newly adjusted position. This action is repeated from time to time as wear in the brake rigging or brake shoes occurs and thus automatically takes up the slack and insures uniform piston travel or brake actuating travel, as the case may be, at all times.

When it is necessary to replace worn parts or brake shoes, the downwardly extending actuating handle 34 of the take up rod 32 is given a turn through 90°, thereby automatically and simultaneously forcing both pawls 30 and 35 out of engagement with the rack 31, which permits the take up rod 32 to be moved inwardly to its original position. On first application of the brakes the entire excess travel will be automatically taken up and the mechanism thereafter insures uniform travel.

It is thus seen that the present invention provides a simple and practical apparatus, well adapted to accomplish among others all of the objects and advantages herein set forth.

Without further analysis, the foregoing will so fully reveal the gist of this invention that others can by applying current knowledge readily adapt it for various applications without embodying certain features that, from the standpoint of the prior art, fairly constitute essential characters of the generic or specific aspects of this invention, and, therefore, such adaptations should and are intended to be comprehended within the meaning and range of equivalency of the following claims.

Having now described my invention, I claim:

1. In an apparatus of the character described, in combination, a casing, an adjusting rod therein, a spring associated with said adjusting rod adapted to be compressed only on excess travel, a rack within said casing, a pawl carried by the adjusting rod and co-operating with said rack, adapted to freely pass over one or more teeth of the rack on excess travel and to move said rack on release of the brakes to take up the excess travel of the brake rigging, means for holding said take up rack to its newly adjusted position, said means comprising a pawl mounted within said casing and cooperating with said rack, a spring engaging said pawl normally urging the same into engagement with the rack, and means for releasing both of said pawls from engagement with the rack, said means comprising a handle whereby said take up rack may be rotated about 90° to throw both of the pawls out of engagement therewith.

2. In an apparatus of the character described, in combination, a casing, an adjusting rod operable only on excess travel of the apparatus and a take up rod mounted in substantial parallelism within said casing, a spring associated with said adjusting rod, a rack formed on said take up rod, a pawl formed with a rearward extension and carried by the adjusting rod and normally cooperating with said rack and adapted to move relatively thereto on excess travel, and means associated with the rearward extension of said pawl and the adjusting rod for urging said pawl into engagement with the rack on release of the brakes.

3. In an apparatus of the character described, in combination with the truck brake rigging of a railway car, a slack adjuster therefor, and a universally movable support for said slack adjuster.

4. In an apparatus of the character described, in combination with the truck brake rigging of a railway car, a slack adjuster therefor, and a universally movable support for said slack adjuster, said universal support being attached to the underside of the car.

5. In an apparatus of the character described, in combination with the truck brake rigging, including live and dead levers, a slack adjuster therefor, a universally movable support for said slack adjuster, and means connecting said slack adjuster with the pull rod of the truck brake rigging for actuating the same on excess travel.

6. In an apparatus of the character described, in combination with the live and dead levers of the truck brake rigging, and a pull rod for actuating the live lever, a slack adjuster flexibly connected with said dead lever and supported from the underside of the car body, said adjuster comprising an adjusting rod actuated by the pull rod only upon excess travel thereof.

7. In an apparatus of the character described, in combination with the truck brake rigging, live and dead levers therefor, a pull rod for actuating the live lever, a slack adjuster flexibly connected with said dead lever and supported from the underside of the car body, said support comprising a bracket for universal connection with the slack adjuster casing.

8. In an apparatus of the character described, in combination with a car body, a slack adjuster suspended from the underside thereof, a truck having live and dead levers, a pull rod connected to said live lever and provided with a collar, and an actuating rod operated by engagement of the collar therewith, said slack adjuster having an adjusting rod connected with the actuating rod whereby the slack adjuster is operated only on excess travel, and a take up rod connected with the upper end of said dead lever.

9. In an apparatus of the character described, in combination with a car body, a slack adjuster suspended from the underside thereof, a truck having live and dead levers, a pull rod connected to said live lever and formed with a collar, and an actuating rod operated by engagement with the collar, said slack adjuster having an adjusting rod connected with the actuating rod whereby the slack adjuster is operated only on excess travel, and a take up rod having a flexible connection with the upper end of said dead lever thereby to permit relative movement between the brake rigging and the adjuster when the truck turns relatively to the car body.

Signed at New York city this 8th day of January, 1925.

WILLIAM H. SAUVAGE.